United States Patent [19]
Athey

[11] 3,927,571
[45] Dec. 23, 1975

[54] TEMPERATURE INDICATING DEVICE
[75] Inventor: Stuart E. Athey, Troy, Ohio
[73] Assignee: Hobart Corporation, Troy, Ohio
[22] Filed: Jan. 18, 1974
[21] Appl. No.: 434,557

[52] U.S. Cl. ............... 73/362; 315/122; 324/99 D; 340/228 R
[51] Int. Cl.² ................ G01K 7/00; G01R 13/02
[58] Field of Search .... 73/362 R, 362 AR; 315/122; 324/96, 99 D, 103 P, 103 R; 340/227 R, 172, 228

[56] References Cited
UNITED STATES PATENTS

| | | | |
|---|---|---|---|
| 490,883 | 1/1893 | Payne | 73/362 R |
| 3,050,713 | 8/1962 | Harmon | 340/172 R |
| 3,494,196 | 2/1970 | Moussette | 73/362 AR |
| 3,573,775 | 4/1971 | Zane | 340/227 R |
| 3,641,546 | 2/1972 | Blackburn | 328/148 |
| 3,725,865 | 4/1973 | Fairchild | 340/172 |
| 3,789,362 | 1/1974 | Prolss et al. | 340/172 R X |
| 3,796,951 | 3/1974 | Joseph | 324/103 P X |
| 3,857,285 | 12/1974 | Athey et al. | 73/362 AR |

FOREIGN PATENTS OR APPLICATIONS

| | | | |
|---|---|---|---|
| 1,065,412 | 4/1967 | United Kingdom | 73/362 SC |

*Primary Examiner*—Richard C. Queisser
*Assistant Examiner*—Frederick Shoon
*Attorney, Agent, or Firm*—Biebel, French & Bugg

[57] ABSTRACT

A digital type temperature indicator employs a thermistor temperature sensor and first and second comparator circuits, each having two inputs, one connected to the thermistor and the other connected to an adjustable reference representing a reference temperature level. A first indicator lamp indicates when the temperature is below a first reference level, a second lamp indicates when the temperature is in the range between the first and a second reference temperature levels, and the third lamp indicates when the temperature exceeds the second reference temperature level.

8 Claims, 2 Drawing Figures

U.S. Patent  Dec. 23, 1975  3,927,571
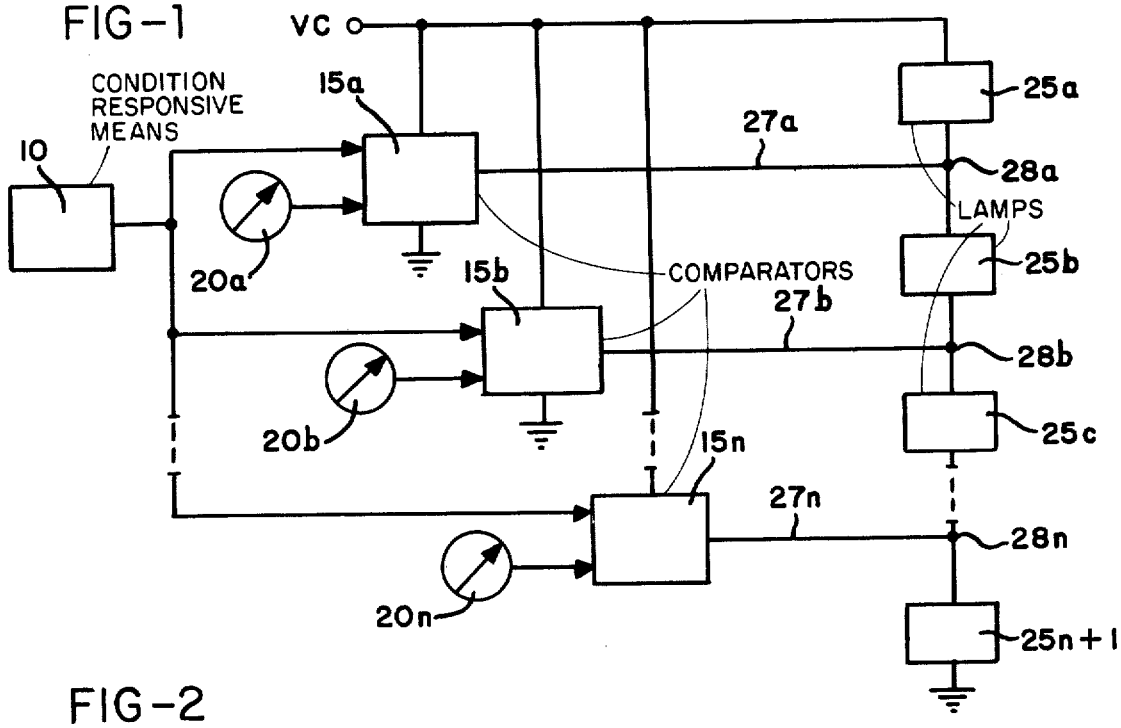
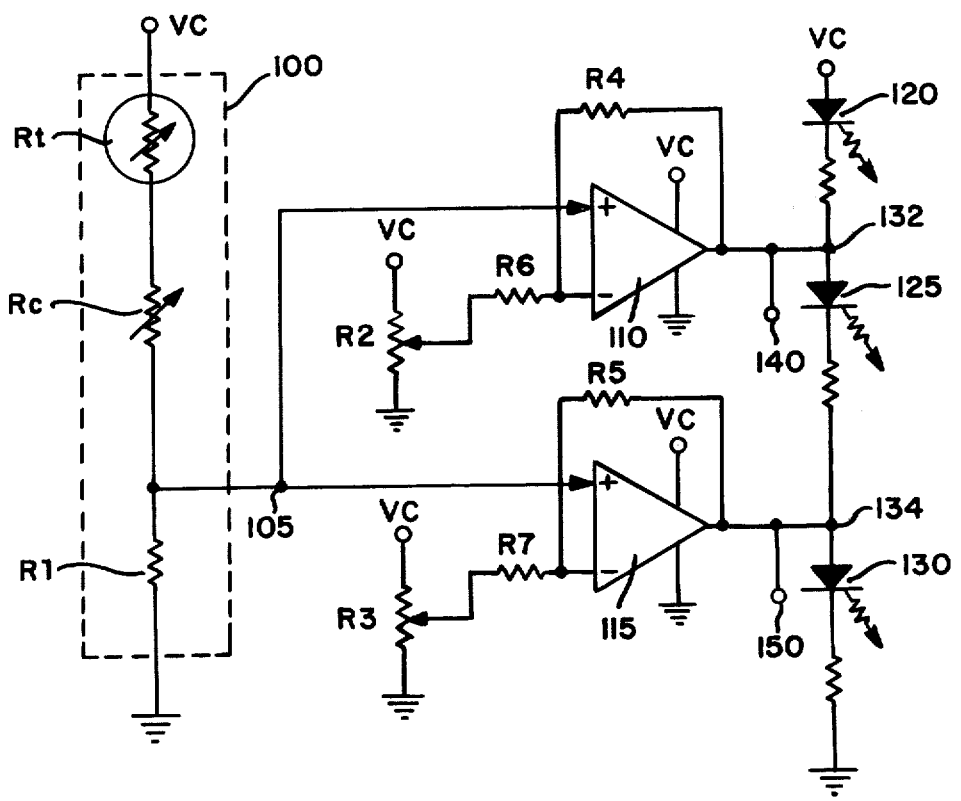

TEMPERATURE INDICATING DEVICE

BACKGROUND OF THE INVENTION

Present dial type temperature indicators used in many applications, including commercial dishwashers, include a sealed tube which extends from the indicator to a sensing bulb placed in the environment under observation. The length of the sealed tube is limited, and this fact, along with mechanical considerations, restricts the placement of the indicator dial.

The health laws, as well as proper dishwashing practice, requires that these indicator dials be accurate, and their accuracy maintained over a long period of time. If, upon inspection, it is found that these temperature indicators are not accurate, they must be serviced and recalibrated, and this frequently requires that they be removed from the dishwasher and shipped to another location and another indicator installed in its place. It has been found that a large number of these dial type indicators are serviced each year, thus adding to the cost of maintenance of the dishwashers.

It is well known to replace bulb type temperature indicators with thermistors, especially since thermistors have proven to be reliable, accurate and capable of maintaining a high degree of accuracy over an extended period of time. Also, electronic temperature sensors do not limit to any substantial degree the placement of the indicator.

Several types of electronic temperature indicators have been developed, employing lamps to indicate temperature. Examples of these prior devices are found in U.S. Pat. Nos. 3,484,728, 3,494,196 and 3,570,313. All of these patents show devices employing a variable resistor which is manually adjusted until an indicator lamp is properly illuminated, at which time the temperature may be determined by reference to a dial associated with that variable resistor.

Of the three patents mentioned above, only U.S. Pat. No. 3,494,196 shows a device including three indicator lamps. One indicator lamp is used to indicate when a bridge, including a thermistor and a variable resistor, is in balance. The other two indicator lamps are used to indicate the direction of bridge unbalance to assist the operator in moving the variable resistor in the proper direction. In all of the devices disclosed in the above mentioned patents, a precise temperature may be determined by reference to an indicator lamp, however, these patents do not disclose any device which indicates when the temperature under observation is within a proper range of temperatures, this range extending over several degrees Fahrenheit.

SUMMARY OF THE INVENTION

This invention relates to a condition indicating apparatus which includes a plurality of indicating lamps, only one of which will be illuminated to indicate the magnitude of the condition under observation. More particularly, this invention relates to a temperature indicating apparatus for indicating whether the temperature of an object under observation is under, over, or within a predetermined range of temperature.

This invention is particularly useful as a temperature indicating device for use with commercial dishwashers where it is desired to know that the washing or rinsing liquid temperature is within a predetermined range. In the preferred form of the invention, three indicator lamps are employed, one for indicating when the temperature is below a first predetermined temperature, a second lamp for indicating when the temperature is between the first predetermined temperature and a second predetermined temperature, and a third lamp for indicating when the temperature exceeds the third predetermined temperature. The lamps employed are preferably light emitting diodes, but conventional incandescent filament lamps may also be employed.

When monitoring the temperature of a washing solution, for example, the minimum temperature is established by code and is 150°F. For proper washing action, the temperature should not exceed 160°F. Therefore, the temperature of the washing solution need merely to be within these limits and not at a particular temperature within this range. As another example, the rinse water temperature should not be less than 180°F. (as established by the codes in many areas), nor should it exceed 200°F., since this approaches the boiling point of water.

Accordingly, this invention provides a temperature indicating apparatus where the operator can determine quickly, and without interpretation of a dial, whether the temperature of the washing or rinsing solutions are within acceptable limits.

It is also within the scope of this invention to provide means responsive to either a low and/or high temperature condition to prevent the continued operation of the machine and to provide a warning and/or safety cutoff device responsive to over temperature conditions.

It is therefore an object of this invention to provide an improved temperature indicating apparatus wherein the temperature of an object or substance under observation is within predetermined temperature limits and to indicate this by means of an indicator lamp, and to provide other lamps for indicating when the temperature is above or below those predetermined limits.

It is also an object of this invention to provide a condition responsive apparatus including a condition responsive means, a plurality of comparator means responsive to the condition responsive means and to reference inputs for providing an output which is either a source of current or ground depending upon the output of the condition responsive means relative to a reference, and a plurality of indicating lamps which are selectively energized one at a time to indicate whether the output of the condition responsive means is above, below, or within a predetermined range.

These and other objects and advantages of the invention will be apparent from the following description, the accompanying drawing and the amended claims.

BRIEF DESCRIPTION OF THE DRAWINGS

FIG. 1 is a block diagram illustrating a general form of condition responsive apparatus;

FIG. 2 is an electrical schematic diagram of one embodiment of the invention.

DESCRIPTION OF THE PREFERRED EMBODIMENT

Reference is now made to FIG. 1 which is a block diagram of a condition indicating apparatus constructed according to this invention. A condition responsive means 10 provides an output which is related to a condition under observation, and this output is applied simultaneously to a plurality of comparator circuit means 15*a*, 15*b* and 15*n*. Each of the comparator circuits is provided with a reference input 20*a*, 20*b*, and 20n, respectively.

A plurality of lamps 25a, 25b, 25c and 25n+1 are connected in series between ground and a source of current Vc. This source of current is also connected to each of the comparator circuits 15. The output of each comparator circuit is connected to the junction between their corresponding lamps. For example, the output 27a of the comparator circuit 15a is connected to the junction 28a between lamps 25a and 25b.

The output of each comparator circuit preferably is either a source of current or ground, and this output is determined by the output of the condition responsive means 10 relative to the respective reference input 20. It should be recognized that the comparator circuits could contain separate switching circuits, such as flip flops, switching transistors, or Schmitt trigger circuits in order to provide the desired output.

By way of example, assume that the reference 20a is set at a value of ten, reference 20b at a value of twenty, and reference 20n to a value of thirty, and further assume that only three comparator circuits 15 are provided. If the output from the condition responsive means is less than ten, then the outputs from all of the comparator circuits will be ground; therefore, current will flow from the source Vc through lamp 25a and line 27a to ground through comparator circuit 15a and only lamp 25a will be illuminated.

However, if the output from the condition responsive means is 25, then the outputs from both comparators 15a and 15b will be sources of current, and will be at a potential substantially equal to that of the source Vc. Under these conditions, only the output of comparator 15n is at ground potential, and therefore current will flow only through lamp 25c. Lamps 25a and 25b will be dark since the potential on either side of the lamp is the same, namely Vc, while lamp 25n+1 will be dark because a ground potential exists on both terminals of the lamp.

Therefore, the lamps will be illuminated one at a time to provide an indication of the magnitude of the condition observed by the condition responsive means 10, with the energization of the lamps not being limited to a particular value of the output of the condition responsive means 10, but being determined by whether or not that output lies between the limits established by the reference inputs 20a–20n.

Referring now to FIG. 2 which shows one embodiment of the invention particularly useful in monitoring the temperature of a liquid, such as the washing or rinsing solution used in commercial dishwashers, a condition responsive or temperature indicating circuit is shown generally at 100 and includes a thermistor Rt connected in series with a calibrating resistor Rc and a voltage dividing resistor Rl.

The thermistor Rt may be a negative coefficient device, i.e., its resistance varies in inverse proportion to the temperature sensed thereby. Therefore, as the temperature increases, the resistance of thermistor Rt will decrease and will cause a corresponding increase of the voltage on line 105. Therefore, the output from the circuit 100 is voltage directly proportional to temperature. This voltage is applied directly an an input to first and second comparator circuits 110 and 115, respectively. Comparator circuit 110 has an adjustable reference input from the center tap of potentiometer R2 while comparator circuit 115 has a reference input obtained from the adjustable tap of potentiometer R3.

The comparator circuits 110 and 115 preferably are operational amplifiers, such as type 741 or 747 operational amplifiers manufactured by Fairchild, and are provided with feedback resistors R4 and R5. Each operational amplifier 110 and 115 is designed to provide an output which is either a high output, corresponding substantially to the voltage of source Vc, or a low output, corresponding substantially to ground potential. In the circuit of FIG. 2, the operational amplifiers will provide a low output when the voltage input from the condition responsive means 100 on line 105 is less than the reference voltage, and a high output when the voltage on line 105 is greater than the reference.

First, second and third indicator lamps 120, 125 and 130 are connected in series between the voltage source Vc and ground. These indicator lamps preferably are light emitting diodes (LEDs). The output from comparator circuit 110 is connected to the junction 137 between the first and second indicator lamps 120 and 125 and the output of comparator circuit 115 is connected to the junction 134 between the second and third indicator lamps 125 and 130.

As long as the temperature sensed by thermistor Rt is less than the temperature represented by the voltage on the center tap of potentiometer R2, or in other words as long as the voltage output on line 105 is less than the voltage on the center tap of R2, comparator circuit 110 will have an output which is low, i.e., ground potential, and therefore current will flow through indicator lamp 120, but no current will flow through indicator lamps 125 or 130.

As the temperature rises, the voltage output on line 105 will increase, and when this voltage exceeds that on the center tap of R2, but does not exceed that on the center tap of potentiometer R3, the output of comparator 110 will go high, thus extinguishing lamp 120 (since it now has voltage Vc on both sides) and illuminating lamp 125. As long as the voltage on line 105 remains between the voltage levels set on the center taps of resistors R2 and R3, lamp 125 will be illuminated and lamps 120 and 130 will remain dark. If the temperature should rise sufficiently to cause the voltage on line 105 to exceed that on the center tap of potentiometer R3, the output from comparator 115 will go high and lamp 130 thereafter will be illuminated and lamps 120 and 125 will be dark.

The transition of the voltage output of comparator circuits 110 and 115 from a voltage substantially equal to Vc to a voltage equal to ground potential occurs with a very small change of input voltage to the comparator circuits since the gain of the comparator circuits is selected to be large. When the comparators 110 and 115 are provided with this large voltage gain, there exists only a few millivolts of input signal range wherein the comparator output signal will fall between the ground and Vc levels and therefore only when the temperature observed by thermistor Rt is exactly equal to the transition voltage will more than one lamp be illuminated. For example, a temperature change of 0.2° will cause one lamp to go from darkness to full illumination while the other lamp goes from full illumination to darkness.

In alternate uses of the invention, the reference inputs 20a–20n may be assigned values which do not overlap, or which are not in the ascending order previously described; for example, input 20a may have a value larger than input 20b which is in turn larger than input 20n; a variety of different relationships between the condition responsive means signal and the pattern of actuated indicator means elements may be obtained by appropriate selection of the reference input signals.

It is within the scope of the invention to provide signal outputs at the terminals 140 and 150 for use with alarm circuits or other circuits for disabling the operation of the device associated with the temperature indicating circuit.

While the form of apparatus herein described constitutes a preferred embodiment of the invention, it is to be understood that the invention is not limited to this precise form of apparatus, and that changes may be made therein without departing from the scope of the invention, which is defined in the appended claims.

What is claimed is:

1. A temperature indicating apparatus for indicating whether a temperature under observation is under, over, or within a predetermined range of temperatures, said apparatus including a single temperature responsive means providing an electrical output which varies in response to the temperature sensed thereby, first and second comparator circuits, each having an input connected to the output of said temperature responsive means, and an input connected respectively to a first and a second adjustable electrical reference source representing first and second reference temperature levels, each of said comparator circuits providing an output which is either a source of current or ground depending upon the magnitude of the input from said temperature responsive means relative to its respective reference source, first, second and third indicator elements connected in series between a source of current and ground, the outputs from said first and second comparator circuits being connected to the junction between said first and second and said second and third indicator lamps, respectively, whereby only said first element is illuminated when the temperature being observed is below the first reference level, only said second lamp is illuminated when the temperature being observed is in the range between the first and second reference levels, and only said third element is illuminated when the temperature being observed exceeds the second reference level.

2. The apparatus of claim 1 wherein said temperature responsive element is a thermistor element.

3. The apparatus of claim 2 wherein said thermistor element is connected in a voltage divider circuit to provide a voltage output correlating positively with the temperature of said thermistor element.

4. The apparatus of claim 1 wherein said comparator circuits are operational amplifiers.

5. The apparatus of claim 4 wherein said operational amplifiers each have has an adjustable source of reference signal connected to one input terminal.

6. The apparatus of claim 1 wherein said indicator elements are energy emitting lamps.

7. The apparatus of claim 6 wherein said energy emitting lamps are light emitting elements.

8. The apparatus of claim 7 wherein said indicator elements are solid state light emitting devices.

* * * * *

UNITED STATES PATENT OFFICE
CERTIFICATE OF CORRECTION

Patent No. 3,927,571      Dated December 23, 1975

Inventor(s) Stuart E. Athey

It is certified that error appears in the above-identified patent and that said Letters Patent are hereby corrected as shown below:

Column 3, line 63, "an an" should read -- as an --.

Column 6, line 6, "lamps" should read -- elements --.

Column 6, line 10, "lamp" should read -- element --.

Column 6, line 26, "each have has an" should read -- each have an --.

Column 6, line 32, "... claim 7" should read -- claim 1 --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*